(12) United States Patent
Kopp et al.

(10) Patent No.: US 7,009,679 B2
(45) Date of Patent: Mar. 7, 2006

(54) CHIRAL BOARDBAND TUNING APPARATUS AND METHOD

(75) Inventors: Victor Il'ich Kopp, Flushing, NY (US); Azriel Zelig Genack, New York, NY (US)

(73) Assignee: Chiral Photonics, Inc., Clifton, NJ (US)

( * ) Notice: Subject to any disclaimer, the term of this patent is extended or adjusted under 35 U.S.C. 154(b) by 251 days.

(21) Appl. No.: 10/389,618

(22) Filed: Mar. 14, 2003

(65) Prior Publication Data

US 2003/0174983 A1    Sep. 18, 2003

Related U.S. Application Data

(60) Provisional application No. 60/364,954, filed on Mar. 14, 2002.

(51) Int. Cl.
*G02F 1/13*        (2006.01)
*H01S 3/08*        (2006.01)

(52) U.S. Cl. .......................... 349/193; 385/10; 385/37; 372/6; 372/7; 372/19; 372/20; 372/96; 372/102

(58) Field of Classification Search ................ 349/193; 385/10, 37, 129–132; 372/17–20, 96, 6–7, 372/102

See application file for complete search history.

(56) References Cited

U.S. PATENT DOCUMENTS

| | | | | |
|---|---|---|---|---|
| 4,826,282 A | * | 5/1989 | Alferness | 372/102 |
| 5,225,930 A | * | 7/1993 | Land et al. | 359/578 |
| 5,471,180 A | * | 11/1995 | Brommer et al. | 333/202 |
| 5,926,497 A | * | 7/1999 | Nitta et al. | 372/96 |
| 6,141,367 A | * | 10/2000 | Fan et al. | 372/53 |
| 6,304,366 B1 | * | 10/2001 | Scalora et al. | 359/328 |
| 6,330,268 B1 | * | 12/2001 | Huang | 372/96 |
| 6,396,859 B1 | * | 5/2002 | Kopp et al. | 372/39 |
| 6,452,713 B1 | * | 9/2002 | White | 359/322 |
| 6,690,688 B1 | * | 2/2004 | Gotoda | 372/20 |
| 6,804,280 B1 | * | 10/2004 | Shchukin et al. | 372/45.01 |
| 6,810,067 B1 | * | 10/2004 | Masood et al. | 372/102 |
| 6,853,654 B1 | * | 2/2005 | McDonald et al. | 372/20 |
| 2002/0118710 A1 | * | 8/2002 | Kopp et al. | 372/7 |
| 2003/0137999 A1 | * | 7/2003 | Spiegelberg et al. | 372/6 |
| 2005/0053102 A1 | * | 3/2005 | Reid | 372/20 |

OTHER PUBLICATIONS

Flood et al "Band gap structrue for periodic chiral media",J. Opt. Soc. Am A, vol. 13, no 7, Jul. 1996, pp. 1395-1406.*

* cited by examiner

*Primary Examiner*—Kenneth Parker
(74) *Attorney, Agent, or Firm*—Edward Etkin, Esq.

(57) ABSTRACT

A chiral structure having an expanded adjustable reflection band to provide broadband tunability is provided. In the preferred embodiment, the chiral structure is implemented as a chiral fiber structure and comprises two or more sequential chiral fiber elements of different pitches, each having a tunable chiral defect generator. The pitches are selected such that the individual photonic band gaps of the elements are formed into one expanded reflection band such that at least one defect state can be formed and moved within the expanded reflection band by selectively activating and adjusting one or more of the tunable chiral defect generator. The tunable chiral defect generators may generate and control defect state(s) in the structure's spectral response by introducing chiral twists and/or spacing between the chiral elements, with the length of the spacings and angles of chiral twists being proportional to the position of the defect state(s) within the reflection band of the structure.

16 Claims, 5 Drawing Sheets

CHIRAL BOARDBAND TUNING APPARATUS AND METHOD

CROSS REFERENCE TO RELATED APPLICATIONS

The present patent application claims priority from the commonly assigned U.S. provisional patent application Ser. No. 60/364,954 entitled "Chiral Fiber Structure with Broadband Tuning Capability" filed Mar. 14, 2002.

FIELD OF THE INVENTION

The present invention relates generally to fiber gratings and functionally equivalent structures, and more particularly to fiber gratings having an expanded adjustable reflection band that are implemented in a chiral structure to provide broadband tunability.

BACKGROUND OF THE INVENTION

Semiconductor lasers have found many industrial and commercial applications in recent years. For example, lasers are used in telecommunications, in pickups for optically readable media used in CD players, CD ROM drives and DVD players, in medical imaging, and in video displays. However, previously known semiconductor lasers have a number of disadvantages. For example, traditional semiconductor lasers, such as ones used in CD players, emit light from the edge of a chip, making it necessary to cleave a wafer into chips and to package the chip before determining whether the laser functions properly. Other types of light sources, such as LEDs do not provide the performance needed for certain applications.

Vertical Cavity Surface Emitted Lasers (hereinafter "VCSELs") have been developed to address the need for a more advanced, higher quality laser that can function well in a variety of applications. VCSELs combine the performance advantages of LEDs and of edge-emitting lasers at costs comparable to LEDs. VCSELs emit light vertically from the wafer surface, like LEDs, allowing for fabrication and testing, which is fully compatible with standard I.C. procedures and equipment. VCSELs have the additional advantage that they can be formed into arrays. In addition, VCSELs are much faster, more efficient, and produce a beam with a smaller divergence than do LEDs.

The VCSEL structure leads to a host of performance advantages over conventional semiconductor lasers.
1) small size
2) low power consumption
3) two-dimensional array capabilities In contrast to conventional edge-emitting semiconductor lasers, the surface-emitting VCSEL has a symmetric Gaussian near-field, greatly simplifying coupling to optical elements or fibers. In addition, VCSEL technology allows the fabrication of two-dimensional laser arrays.

However, VCSELs suffer from a number of disadvantages. Their manufacture requires sophisticated and expensive microfabrication. Since single-pass gain in thin layer semiconductor lasers is low, VCSELs incorporate highly reflective dielectric stacks which are integrated into the laser as Bragg reflectors. These consist of alternating layers of dielectric material, which are grown using methods of molecular beam epitaxy (MBE). This ensures a close match of the atomic lattice structures of adjacent layers. Alternating atomically ordered layers of materials with different electronic characteristics are thereby produced. The interfaces between the layers must be digitally graded and doped to reduce the electrical resistance.

Much work has been done to improve the performance of VCSELs by increasing the number of layers and/or the dielectric difference between alternating layers. However, this approach makes the fabrication more expensive and difficult. There is also a limit to the number of layers determined by the absorption in these layers. While VCSELs can be manufactured in two-dimensional arrays, there has been great difficulty in achieving uniform structure over large areas. The materials used for VCSELs generally do not have the desired low absorption and high index contrast over a broad frequency range. In particular, it is difficult to achieve high reflectivity in the communication band around 1.5 microns. In addition, VCSELs cannot be tuned in frequency since their periods cannot be changed. In addition, an external device must be used to control the polarization of the light.

In recent years, chiral materials, such as cholesteric liquid crystals have been demonstrated and proposed in a variety of lasing and filtering applications to address common drawbacks of standard semiconductor devices such as VCSELs. For example, a commonly assigned U.S. Pat. No. 6,404,789 entitled "Chiral Laser Apparatus and Method," discloses a chiral laser with a defect formed by a light-emitting material layer. While this approach is advantageous with respect to previously known techniques, it may be difficult to construct a layered structure having a precise light emitting material thickness required to produce a defect (the required thickness must be approximately equal to the wavelength of light in the medium divided by 4). More importantly, the position of the localized state caused by the defect cannot be easily controlled because the thickness of the light-emitting material cannot be changed once the device is manufactured.

One approach that addressed this problem was disclosed in the commonly assigned U.S. Pat. No. 6,396,859 entitled "Chiral Twist Laser and Filter Apparatus and Method" which is hereby incorporated by reference herein in its entirety. The novel approach of this patent involved creating a localized state by inducing a defect in a chiral structure composed of multiple chiral elements, by twisting one element of the chiral structure with respect to the other elements along a common longitudinal axis such that directors of the element's molecular layers that are in contact with one another are disposed at a particular "twist" angle therebetween. The resulting "chiral twist structure" enabled control of the position of the localized defect state within the photonic band gap by varying the twist angle.

This novel chiral twist structure is advantageous for a variety of applications including, but not limited to, EM filters, detectors, and lasers that are readily tunable by varying the twist angle. The only limitation of a chiral twist structure is the width of the photonic band gap within which the defect state may be moved. Essentially, the width of the photonic band gap determines the tunability bandwidth of the device. In certain telecommunication applications, it may be useful to have two or more defect states in the expanded band gap.

It would thus be desirable to provide a chiral structure and method of provision thereof that has a greater tunability bandwidth (i.e. an expanded reflection band) than a standard chiral twist structure. It would further be desirable to provide a chiral structure and method of construction thereof that comprises two or more independently controllable defects within the expanded reflection band.

BRIEF DESCRIPTION OF THE DRAWINGS

In the drawings, wherein like reference characters denote elements throughout the several views.

SUMMARY OF THE INVENTION

Figure 1:
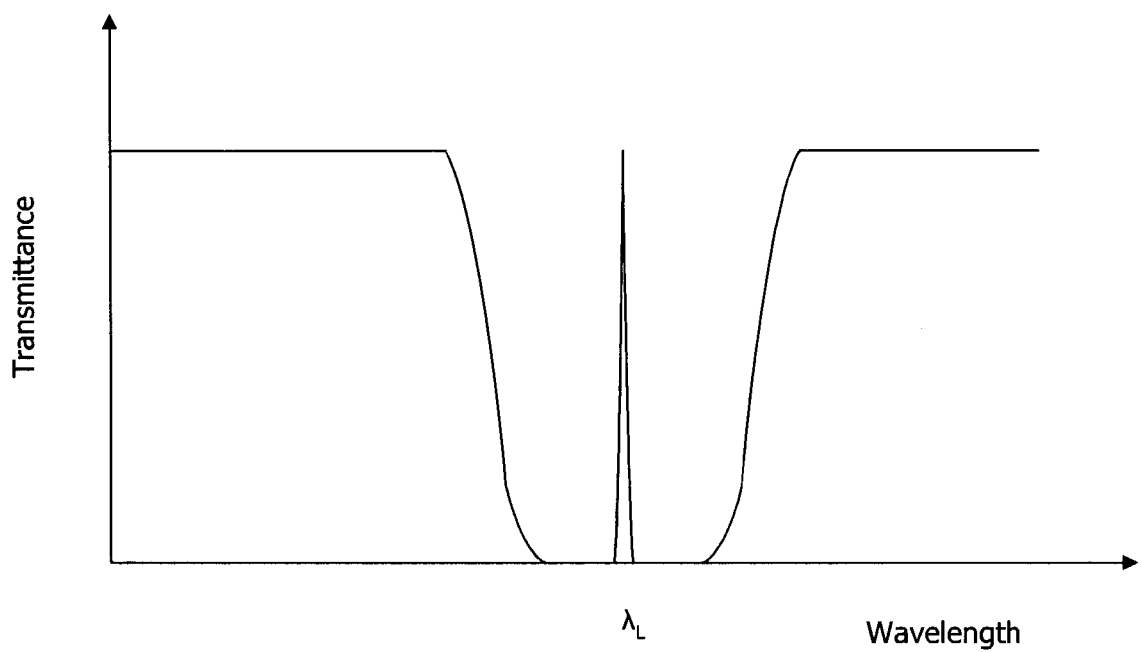
FIG. 1 is a graph diagram of a photonic band gap in a typical chiral twist structure.

The present invention is directed to a novel chiral broadband tuning structure, having an expanded adjustable photonic band gap to provide broadband tunability, that may be based on a thin film chiral structure, for example composed of multiple sequential cholesteric liquid crystal (CLC) layers, or, preferably, based on a specially configured optical chiral fiber structure, for example, having advantageous optical properties similar to a CLC structure.

The chiral fiber structure preferably used in the inventive chiral broadband tuning structure achieves optical properties similar to a CLC structure because it satisfies the requirement that in a CLC structure the pitch of the structure is twice its period. This is accomplished by using a chiral fiber structure having geometric birefringence with 180 degree symmetry. Such properties may be obtained by imposing two identical coaxial helices along a fiber structure, where the second helix is shifted by half of the structure's pitch forward from the first helix. Such structures are described in greater detail in the co-pending commonly assigned U.S. Patent applications entitled "Apparatus and Method for Manufacturing Fiber Gratings", "Apparatus and Method of Manufacturing Helical Fiber Bragg Gratings", "Apparatus and Method for Fabricating Helical Fiber Bragg Gratings", "Helical Fiber Bragg Grating", and "Long Period Chiral Fiber Grating and Apparatus and Method of Fabrication Thereof" which are hereby incorporated by reference herein in their entirety. Several embodiments of the inventive chiral broadband tuning structure are discussed below.

In the preferred embodiment, the chiral structure is implemented as a chiral fiber structure and comprises two or more sequential chiral fiber elements with different pitches, each incorporating a tunable chiral defect generator (for example, a chiral twist that can be rotated) for generating and controlling the defect state(s) in the structure's spectral response. Essentially, each tunable chiral defect generator can be adjusted to generate and move a defect state within a photonic band gap (PBG) of the element. The pitch of each chiral fiber element is selected such that the individual reflection bands associated with the respective PBGs of the elements are formed into a single expanded reflection band, such that at least one defect state can be formed and moved within the expanded reflection band by selectively adjusting one or more of the chiral defect generators. Each tunable defect generator may comprise a chiral twist having an adjustable angle, a spacing having an adjustable length or a combination of the two. The chiral twist angle and the length of the spacing are both proportional to the position of the defect state within the PBG of the structure.

In another embodiment of the present invention, thin film chiral structures, for example composed of multiple sequential CLC layers, are utilized similarly as described above—two or more thin film chiral elements, each having a tunable chiral defect generator, are arranged sequentially and each has a pitch selected such that the individual PBGs of the elements do not fully overlap so that a single expanded reflection band is formed.

In both of the above-described embodiments, a single defect state can be maintained in the inventive broadband chiral structure by activating the tunable chiral defect generator in only one chiral element at one time while keeping the tunable chiral defect generators inactive in all other elements. However, in some industrial applications, for example in filtering, it may be useful to switch between two or more frequencies without sweeping through intervening frequencies. This may be accomplished by providing a chiral broadband tuning structure with an expanded reflection band having two or more independently controllable defect states therein. Each chiral element having an active tunable chiral defect generator (e.g., having a chiral twist angle other than zero, and/or having a spacing length greater than zero) will generate a defect state in the corresponding element falling within the expanded reflection band. Thus, by selectively activating and controlling the tunable chiral defect generators in multiple chiral elements of the inventive structure, an expanded reflection band having multiple controllable defect states disposed therein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The present invention is directed to an advantageous broadband tunable chiral structure that provides broadband tunability through an expanded photonic band gap. The novel chiral structure can be implemented in a thin film chiral medium, or preferably, in a chiral optical fiber. The novel broadband thin film or fiber chiral structure can be readily tuned, utilizing a tunable chiral defect generator, by moving a defect state within the expanded photonic band gap (hereinafter "PBG").

Before describing the present invention in greater detail, it would be helpful to provide definitions of common terms utilized in the dielectric component. "Chiral" materials are not symmetrical on a molecular level—that is molecules of chiral materials are not identical to their mirror images. Cholesteric materials, such as cholesteric liquid crystals (hereinafter "CLCs"), have multiple molecular layers in which molecules in the different layers are oriented on average at a slight angle relative to molecules in other layers. Molecules in consecutive layers are rotated slightly relative to those in the preceding layer. Thus, the average direction of the molecules, known as a "director", rotates helically throughout the cholesteric material. A pitch of a cholesteric material is defined as a thickness of the material in which the director rotates a full 360 degrees.

CLCs, and other chiral structures having similar properties, have a particular reflection band (associated with the PBG) which is a result of its periodic structure—a range of wavelengths in which the transmission of light through the structure is small as a result of multiple coherent reflection within the structure. At the edge of the photonic stop band gap there are a series of narrow photonic states (or modes) at the peak of which transmission of light reaches unity. The spectral width of these states is proportional to the inverse of the dwell time for the photons within the CLC medium.

When a defect is introduced into a CLC structure by modifying the periodic structure by adding a spacing, an additional layer of a different material, or an angular twist between consecutive layers, then an additional localized photonic state or number of photonic states may be introduced into the photonic stop band. An example of a spectrum with a feature associated with such a localized state in the center of the photonic stop band is shown in a graph of FIG. 1.

A thin film chiral structure, such as may be used in conjunction with the present invention, is described in greater detail in the above-described U.S. Pat. Nos. 6,404,789 and 6,396,859. An exemplary thin film chiral structure may comprise several sequential layers within a CLC film.

A chiral fiber is a novel structure that mimics CLC properties—the cholesteric periodic photonic band gap structure—in a fiber form. A commonly assigned co-pending U.S. Patent Application entitled "Chiral Fiber Grating" (hereinafter "CFB")) which is hereby incorporated by reference in its entirety, disclosed the advantageous implementation of the essence of a cholesteric periodic PBG structure in an optical fiber. This novel approach captured the superior optical properties of CLCs while facilitating the manufacture of the structure as a continuous (and thus easier to implement) process. The chiral fiber structure is preferable for implementing broadband tuning because of the relative ease of implementing multiple chiral twists in the structure as described below.

Referring now to FIG. 1, a graph of the spectrum of a standard PBG of a chiral defect structure (such as a chiral fiber grating with a chiral twist defect) is shown. A 90 degree twist angle between two portions of the element creates a defect state in the center of the PBG. Varying the twist angle causes the defect state to move within the PBG.

Figure 2A:
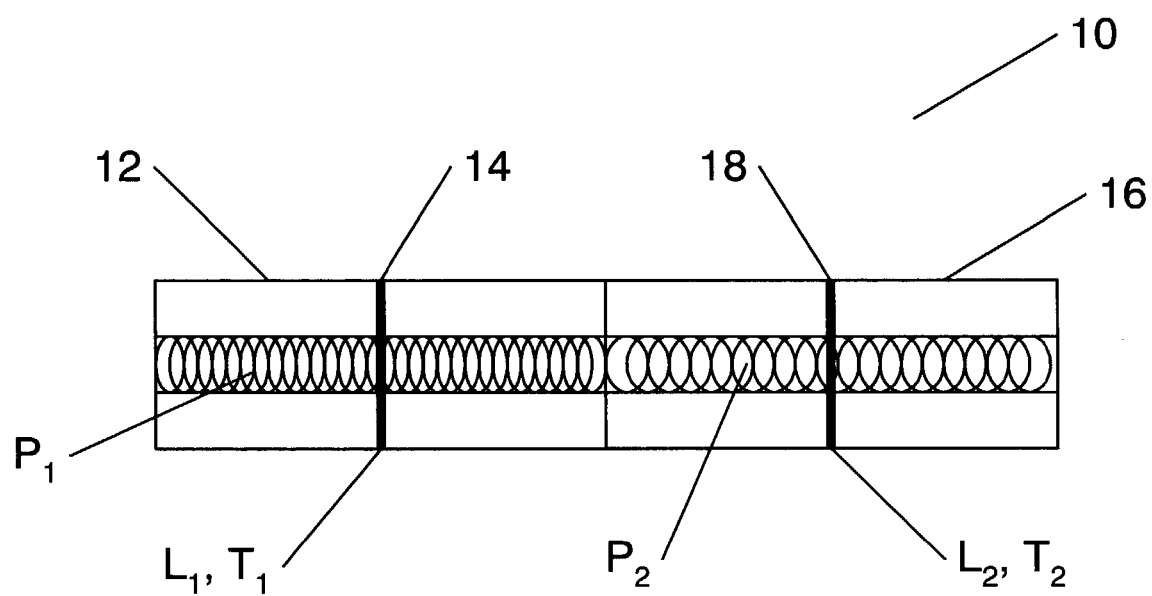
FIG. 2A is a schematic diagram of a first embodiment of the broadband tunable chiral structure of the present invention implemented with chiral fibers.

Referring now to FIG. 2A, an exemplary preferred embodiment of a broadband chiral fiber structure 10 is shown. The fiber structure 10 includes a first chiral fiber element 12 of a first pitch $P_1$ having a tunable chiral defect generator 14, and a sequential second chiral fiber element 16 of a second pitch $P_2$, having a tunable chiral defect generator 18. The tunable chiral defect generators 14, 18 may be chiral twists of twist angles $T_1$, and $T_2$, respectively, spacings of lengths $L_1$, and $L_2$, respectively, or a combination of both chiral twists and spacings. The chiral twist angles $T_1$, and $T_2$ and the lengths of the spacings $L_1$, and $L_2$, are both proportional to the position of the defect state within the PBG of the structure and may thus be selectively varied to generate and move the defect state within the reflection band. It should be noted that while the tunable chiral defect generators 14, 18 are described with reference to chiral twists and spacings, they may be implemented with any other form of chiral defects, such as for example introduction of a different material into a spacing between two portions of a chiral element, as a matter of design choice without departing from the spirit of the invention.

The essence of the invention is that the relationship between the values of $P_1$ and $P_2$ is such, that the structure 10 will have an expanded reflection band having a width approximately equal to the sum of both reflection bands of the elements 12, 16. This relationship may be expressed as $\Delta P/P < \Delta n/n$, where $\Delta P = P_2 - P_1$, $P = (P_1 + P_2)/2$, and $\Delta n/n$ is the birefringence divided by the average index of refraction of the elements 12 and 16 and is thus representative of the relative width of the reflection band of each element 12, 16. For example, $\Delta n/n$ may be 0.015 for a standard optical fiber, in which case $P_2 < (1.015)*P_1$.

It should be noted that for optimal results, $\Delta P/P$ should only be slightly less that $\Delta n/n$—this will ensure that the reflection bands of elements 12, 16 will not substantially overlap, thus maximizing the bandwidth of the expanded reflection band. The expanded reflection band is described in greater detail below in connection with FIG. 3.

Figure 2B:
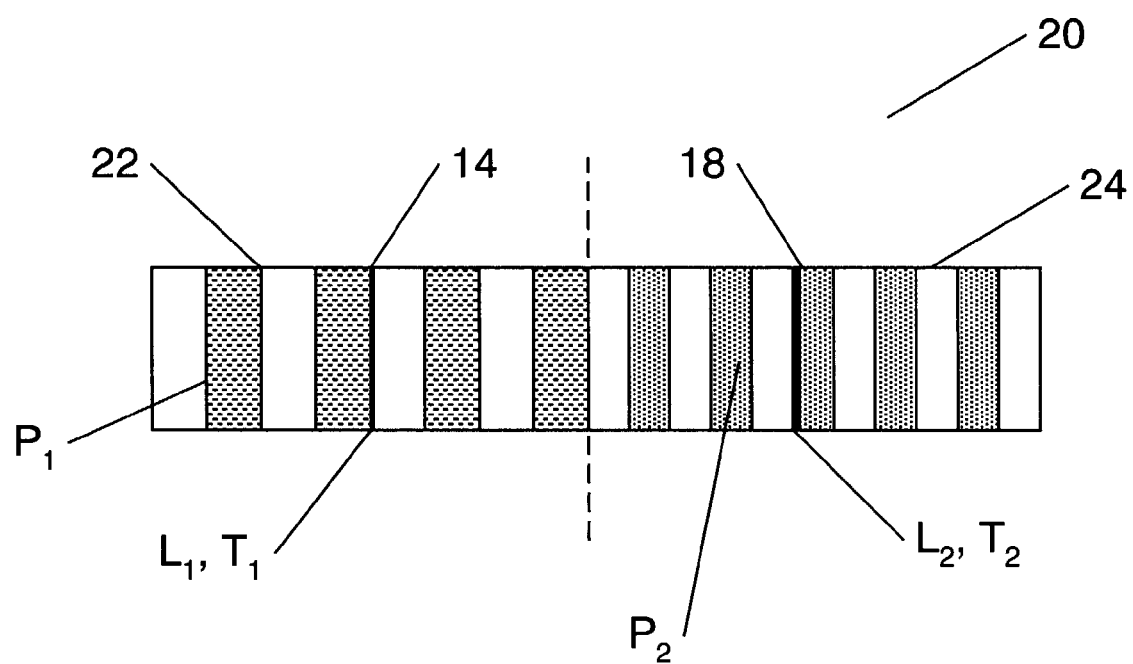
FIG. 2B is a schematic diagram of a second embodiment of the broadband tunable chiral structure of the present invention implemented with thin film chiral elements.

Referring now to FIG. 2B, an alternate embodiment of the inventive chiral broadband tuning structure is shown as a broadband chiral structure 20. The fiber structure 20 includes a first chiral element 22 of a first pitch $P_1$ having a tunable chiral defect generator 14, and a sequential second chiral twist element 24 of a second pitch $P_2$ having a tunable chiral defect generator 18. The chiral elements 22, 24 may be any thin film periodic structures capable of having a tunable chiral defect (such as a chiral twist and/or spacing) implemented therein. For example, they may be composed of thin CLC films.

As in the chiral structure 10 of FIG. 2A, the relationship between the values of $P_1$ and $P_2$ is such, that the structure 20 will have an expanded reflection band having a width approximately equal to the sum of the two reflection bands of elements 22, 24.

Figure 3:
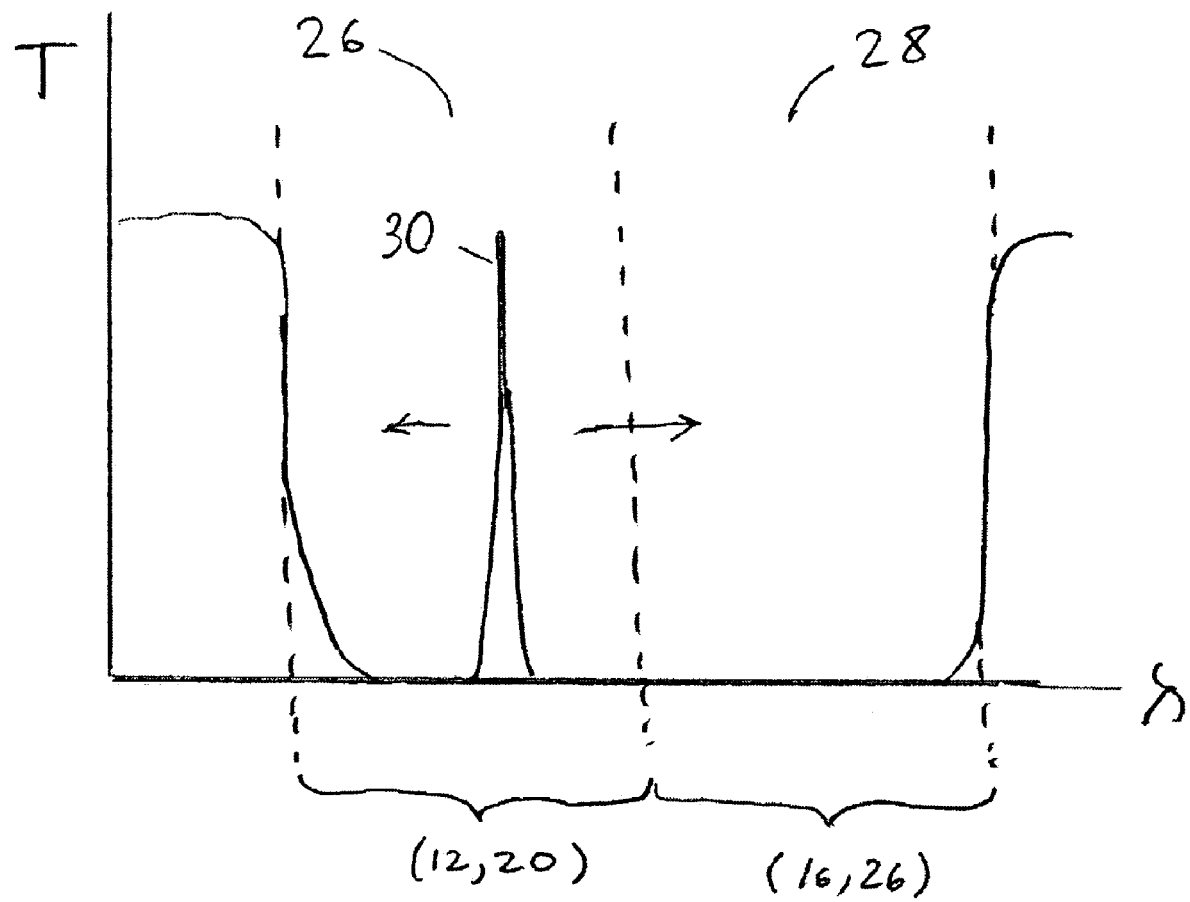
FIG. 3 is a graph diagram of an expanded photonic band gap of the chiral structures of FIGS. 2A and 2B.
Figure 4:
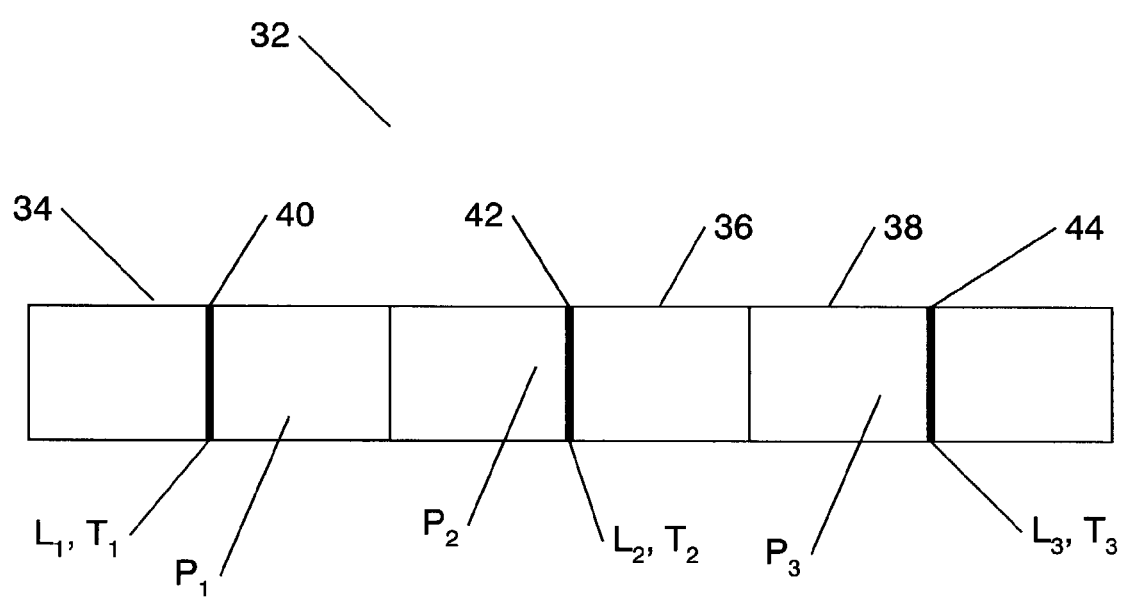
FIG. 4 is a schematic diagram of a third embodiment of the broadband tunable chiral structure of the present invention.

Referring now to FIG. 3, a graph of the expanded reflection band of chiral structures 10 and 20 is shown. The expanded reflection band consists of two overlapping reflection bands—a region 26 (corresponding to the chiral fiber element 12 of FIG. 2A, or the chiral thin film element 22 of FIG. 2B) and a region 28 (corresponding to the chiral fiber element 16 of FIG. 2A, or the chiral layered element 24 of FIG. 2B). By selectively activating and controlling one of the tunable chiral defect generators 14, 18, a defect state 30 can be generated and moved through the entire expanded reflection band, thus providing broadband tunability. When the chiral defect generators 14, 18 are chiral twists, this may be accomplished by keeping one of the twist angles ($T_1$ or $T_2$) at zero and changing the other twist angle. For example, if the twist angle $T_2$ is kept at zero and the twist angle $T_1$ is changed, the defect state 30 will appear and move through the region 26. When the chiral defect generators 14, 18 are spacings, this may be accomplished by keeping one of the spacing lengths ($L_1$ or $L_2$) at zero and increasing the other spacing length. For example, if the spacing length $L_2$ is kept at zero and the spacing length $L_1$ is changed, the defect state 30 will appear and move through the region 26. When the tunable chiral defect generators 14, 18 include both chiral twists and spacings, either or both twist angle and spacing length of one of tunable chiral defect generators 14, 18 may be changed to generate and control the defect 30 in a corresponding region of the reflection band.

In some industrial applications, for example in filtering, it may be useful to switch between two or more frequencies without sweeping through intervening frequencies. This may be accomplished by providing a chiral broadband tuning structure with an expanded reflection band having two or more independently controllable defect states therein. While only one defect state 30 is shown in FIG. 3, in an alternate embodiment of the present invention, the tunable chiral defect generators 14, 18 can be activated and selectively controlled to produce two independent defect states, one in region 26, controlled by the tunable defect generator 14, and one in region 28, controlled by the tunable defect generator 18.

The inventive broadband chiral fiber structures 10, 20 are not limited to two chiral elements—three or more sequential chiral fiber or thin film elements may be used to generate a broader expanded reflection band. An exemplary embodiment of a broadband chiral structure 32 with three elements 34, 36, 38, of respective pitches $P_1$, $P_2$, $P_3$, having respective tunable chiral defect generators 40, 42, 44 (each comprising one or both of respective chiral twist angles $T_1$, $T_2$, and $T_3$, and spacing lengths $L_1$, $L_2$, and $L_3$) are shown in FIG. 3. The relationships between the pitches are defined as above: $P_2=P_1*(1+\Delta n/n)$, while $P_3=P_2(1+\Delta n/n)$. As for the expanded reflection band shown in FIG. 3, each chiral element in a broadband chiral structure having three or more chiral elements contributes to the expanded reflection band.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A broadband tunable chiral structure comprising:
   a first chiral element of a first pitch, having a first photonic band gap and having a first tunable defect generator therein; and
   a sequential second chiral element of a second pitch, having a second photonic band gap and having a second tunable defect generator therein, wherein said first and second pitches are selected such that said first and said second photonic band gaps overlap to form a expanded reflection band, and wherein at least one of said first and second tunable defect generators are operable to generate and move at least one defect state within said expanded photonic band gap to thereby provide broadband tunability to the structure.

2. The broadband tunable chiral structure of claim 1, wherein said first tunable defect generator comprises at least one of: a first chiral twist of a first angle and a first spacing of a first length, and wherein said second tunable defect generator comprises at least one of: a second chiral twist of a second angle and a second spacing of a second length.

3. The broadband tunable chiral structure of claim 2, wherein said first tunable defect generator is operable by selectively varying said first angle of said first chiral twist, and wherein said second tunable defect generator is operable by selectively varying said second angle of said second chiral twist.

4. The broadband tunable chiral structure of claim 2, wherein said first tunable defect generator is operable by selectively varying said first length of said first spacing, and wherein said second tunable defect generator is operable by selectively varying said second length of said second spacing.

5. The broadband tunable chiral structure of claim 1, wherein said overlap is sufficient to eliminate undesired photonic states within said expanded reflection band.

6. The broadband tunable chiral fiber structure of claim 1, wherein each of said first and said second chiral elements is composed of a material having a predetermined relative birefringence, and wherein relationship between said first pitch and said second pitch is approximately defined by a following expression:

$\Delta P/P < \Delta n/n$ where $\Delta n/n$ is said relative birefringence, $\Delta P=P_2-P_1$, $P=(P_2+P_1)/2$ where $P_2$ is said second pitch and where $P_1$ is said first pitch.

7. The broadband tunable chiral structure of claim 6, wherein $\Delta P/P$ is as close as possible to $\Delta n/n$ without being equal thereto, such that a bandwidth of said expanded reflection band is maximized.

8. The broadband tunable chiral structure of claim 1, wherein said first and said second chiral elements each comprise a chiral fiber structure.

9. The broadband tunable chiral structure of claim 1, wherein said first and said second chiral elements each comprise a thin-film chiral structure.

10. The broadband tunable chiral structure of claim 9, wherein each said thin film chiral structure comprises at least one cholesteric liquid crystal thin film.

11. The broadband tunable chiral structure of claim 1, wherein said first tunable defect generator is operable to move one of said at least one defect states in a first portion of said expanded reflection band corresponding to said first refection band, and wherein said second tunable defect generator is operable to move another one of said at least one defect states in a second portion of said expanded reflection band corresponding to said second reflection band.

12. The broadband tunable chiral structure of claim 1, further comprising at least one additional sequentially positioned chiral element, each of said at least one additional chiral elements having a photonic band gap, a pitch, and a tunable defect generator, said pitch of each of said at least one additional chiral elements being selected such that said photonic stop band of each of said at least one additional chiral elements overlaps with a photonic band gap of a previous chiral element, to form a broad reflection band together with said expanded reflection band, and wherein at least one of said first and second tunable defect generators and said tunable defect generators of each of said at least one additional chiral elements, are operable to generate and move at least one defect state within said broad reflection band to thereby provide broadband tunability.

13. The broadband tunable chiral structure of claim 12, wherein each of said at least one additional tunable defect generators comprises at least one of: a first chiral twist of a predetermined angle and a spacing of a predetermined length.

14. The broadband tunable chiral structure of claim 13, wherein each of said at least one tunable defect generators is operable by selectively varying said predetermined angle of said chiral twist.

15. The broadband tunable chiral structure of claim 13, wherein each of said at least one tunable defect generators is operable by selectively varying said predetermined length of said spacing.

16. A method for providing a broadband tunable chiral structure comprising the steps of:
   (a) providing a first chiral element of a first pitch, having a first photonic band gap and having a first tunable defect generator; and
   (b) providing, sequentially to said first chiral element, at least one additional sequential chiral element, each of said at least one additional chiral elements having a photonic band gap, a pitch, and tunable defect generator, said pitch of each of said at least one additional chiral elements being selected such that said photonic stop band of each of said at least one additional chiral elements overlaps with a photonic band gap of a previous chiral element, to form a broad reflection band; and (c) selectively controlling at least one of said first tunable defect generator and of said at least one additional tunable defect generators, to generate and move at least one defect state within said broad reflection band to thereby provide broadband tunability to the structure.

* * * * *